May 16, 1933.   C. S. CRICKMER   1,909,663
PACKER
Filed May 2, 1932
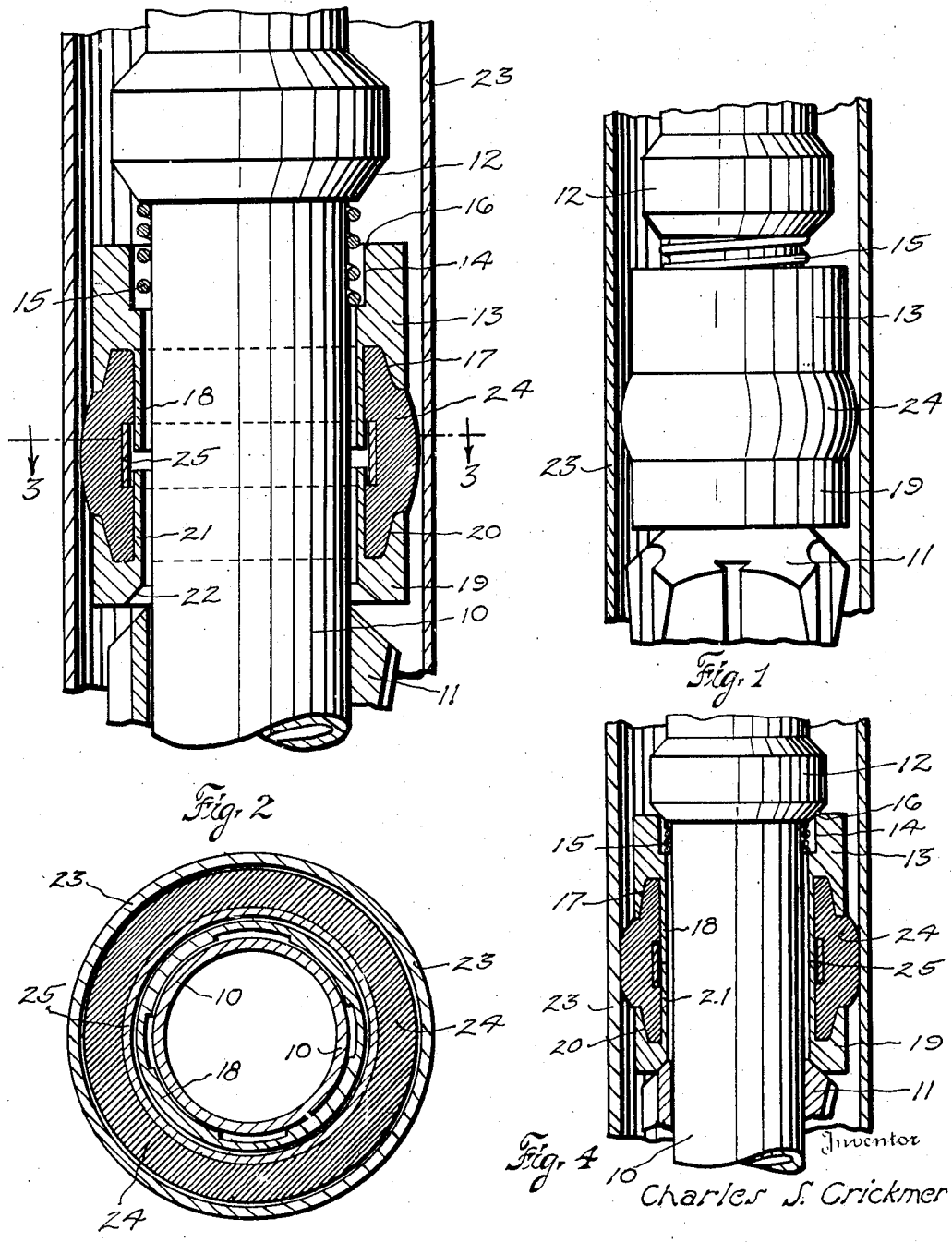
Inventor
Charles S. Crickmer
By Jack A. Schley
Attorney Patented May 16, 1933

1,909,663

UNITED STATES PATENT OFFICE

CHARLES S. CRICKMER, OF DALLAS, TEXAS, ASSIGNOR TO THE GUIBERSON CORPORATION, OF DALLAS, TEXAS, A CORPORATION OF DELAWARE

PACKER

Application filed May 2, 1932. Serial No. 608,656.

This invention relates to new and useful improvements in packers.

One object of the invention is to provide an improved non-crimping or pinching ring for an elastic collar of a packer.

Another object of the invention is to provide a guard ring mounted on the inner circumference of an elastic packing collar of a packer for preventing the elastic material from being pinched between the ends of the packer bushings, thus obviating cutting or crimping of said material, as well as keeping said material from interfering with the full closing action of the bushings.

A further object of the invention is to provide a non-elastic ring mounted on the inner wall of an elastic packing collar, whereby said collar is caused to deform outwardly and is prevented from distorting inwardly when compressed.

A construction designed to carry out the invention will be hereinafter described together with other features of the inventon.

The invention will be more readily understood from a reading of the following specification and by reference to the accompanying drawing in which an example of the invention is shown, and wherein:

Figure 1 is an elevation of the upper portion of a packer having a collar constructed in accordance with the invention, Figure 2 is an enlarged view similar to Figure 1, partly in elevation and partly in section, Figure 3 is a horizontal sectional view taken on line 3—3 of Figure 2, and Figure 4 is a reduced view similar to Figure 2 showing the collar compressed and engaging the casing.

In the drawing the numeral 10 designates a tubular mandrel, on the lower portion of which a slip head 11 is slidably mounted, and an annular valve 12 is fastened on the upper portion of the mandrel.

An upper collar 13 is slidably mounted on the mandrel below the valve and has an annular recess 14 in its upper portion. A coiled spring 15, surrounding the mandrel and bearing against the valve, is seated in the recess 14, to hold the valve above a seat 16 in the top of the collar 13. The underside of the said collar has an annular socket 17, the inner wall of which is extended to form an annular bushing 18.

A lower collar 19 has an annular socket 20, similar to the socket 17, and an annular bushing 21 similar to the bushing 18 of the upper collar 13. The collar 19 is provided with a beveled seat 22 to engage the slip head 11. When the slips (not shown) engage the casing 23 and hold the head stationary in the casing, the seat 22 will come to rest on the head 11, thereby limiting further downward movement of the collar 19.

An annular packing collar 24, of elastic or any material suitable for the purpose, has its ends inserted in the sockets 17 and 20 of the collars 13 and 19 respectively. This collar is provided, on its inner surface, intermediate its ends, with a recess in which an annular ring or band 25 is embedded. This ring is a non-pinching or non-crimping ring. It prevents the rubber 24 from expanding inwardly, and thereby being cut or pinched between the edges of the bushings 18 and 21. When the collar 24 is compressed by the collars 13 and 19, this ring prevents the rubber from flowing inwardly and thus causing it to distort outwardly. The internal diameter of the ring is larger than the external diameter of the bushings. This variance in diameter will allow free play between the ring and the bushings and will not bind on the bushings when the rubber collar is compressed.

In operation, the packer is lowered in the well to the place where it is desired to set it. The slips (not shown) are set in the usual way. This will hold the slip head 11 stationary in the well. The mandrel 10 is next lowered until the seat 22 rests on the slip head. As the mandrel is further lowered the valve 12 will engage the valve seat 16 and start forcing the collar 13 downwardly, thus compressing the collar 24 so that it will engage the casing and form a seal in the usual manner.

The ring 25 on the inner wall of the collar 24 prevents the ends of the bushing pinching the said collar.

This collar is designed particularly for packers such as the one shown in Patent No. 1,777,021, but it is to be understood that the collar can be used for any packer where the guard ring 25 would be useful.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

Having illustrated and described a preferred form of the invention, what I claim is:

1. The combination with the metallic collars of a packer and their abutting bushings, of an elastic collar carried by the metallic collars and surrounding the bushings, and a metallic band mounted in the elastic collar and exposed to the bushings for preventing pinching of the said collar when the bushings are abutted.

2. An elastic packing collar having a metallic band exposed on its inner surface and located intermediate the ends of said collar, whereby said collar may be longitudinally compressed above and below said band.

3. An elastic packing collar having a metallic band embedded in its inner surface and exposed in the bore of the collar, said band being intermediate the ends of said collar, whereby the collar may be compressed above and below said band.

4. In a packer, a pair of abutting bushings, an elastic collar mounted between said bushings and compressible therebetween, and a metallic band in the collar overlapping the adjacent ends of said bushings for preventing said ends pinching said collar therebetween.

5. In a packer, a pair of metallic collars, reduced bushings extending toward each other from said collars, an elastic collar engaging the metallic collars and surrounding the bushings in engagement therewith, the elastic collar being compressed by the metallic collars, the bushings abutting and limiting the compression, and a metallic band in the elastic collar overlapping the ends of the bushings for preventing pinching of said elastic collar.

In testimony whereof I affix my signature.

CHARLES S. CRICKMER.